(12) United States Patent
Tsai et al.

(10) Patent No.: US 7,304,926 B2
(45) Date of Patent: Dec. 4, 2007

(54) MOTOR CONTROL SYSTEM HAVING OUTPUT CLAMP FUNCTION AND METHOD OF THE SAME

(75) Inventors: Chao-Lung Tsai, Hsin-Chu (TW); Chang-Long Wu, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 522 days.

(21) Appl. No.: 10/969,993

(22) Filed: Oct. 22, 2004

(65) Prior Publication Data
US 2005/0135214 A1    Jun. 23, 2005

(30) Foreign Application Priority Data
Dec. 19, 2003  (TW) ............... 92136317 A

(51) Int. Cl.
*G11B 7/00* (2006.01)
(52) U.S. Cl. .............. 369/47.44; 369/53.18; 369/53.3; 369/47.36
(58) Field of Classification Search ........... 369/47.44, 369/53.18
See application file for complete search history.

(56) References Cited

U.S. PATENT DOCUMENTS

| | | | |
|---|---|---|---|
| 4,481,615 A * | 11/1984 | Hioki .................. | 369/47.43 |
| 5,161,141 A | 11/1992 | Sawata | |
| 5,323,379 A * | 6/1994 | Kim .................... | 720/707 |
| 5,526,328 A * | 6/1996 | Oshima et al. ......... | 369/13.02 |
| 5,701,284 A * | 12/1997 | Lee .................... | 369/47.44 |
| 5,995,463 A | 11/1999 | Sakashita | |
| 2003/0007433 A1* | 1/2003 | Takayama et al. ....... | 369/47.44 |
| 2005/0111321 A1* | 5/2005 | Huang et al. .......... | 369/47.39 |

\* cited by examiner

*Primary Examiner*—Wayne Young
*Assistant Examiner*—Van T. Pham
(74) *Attorney, Agent, or Firm*—Troxell Law Office, PLLC

(57) ABSTRACT

A motor control system comprises a motor controller and a clamp apparatus and is used for controlling a motor apparatus. The motor controller is used for generating a motor control output according to a reference signal and a feedback signal from the motor apparatus. The clamp apparatus is used for receiving the motor control output and has a clamp function for clamping the motor control output. The clamp apparatus determines whether the clamp function should be activated to clamp the motor control output within an acceptable clamp range according to at least one motor stability signal. When the motor stability signal indicates that the motor apparatus has been in a stable state, the clamp apparatus clamps the motor control output from the motor controller in the acceptable clamp range, so as to avoid an abnormal motor control output resulting from external sudden change.

20 Claims, 5 Drawing Sheets

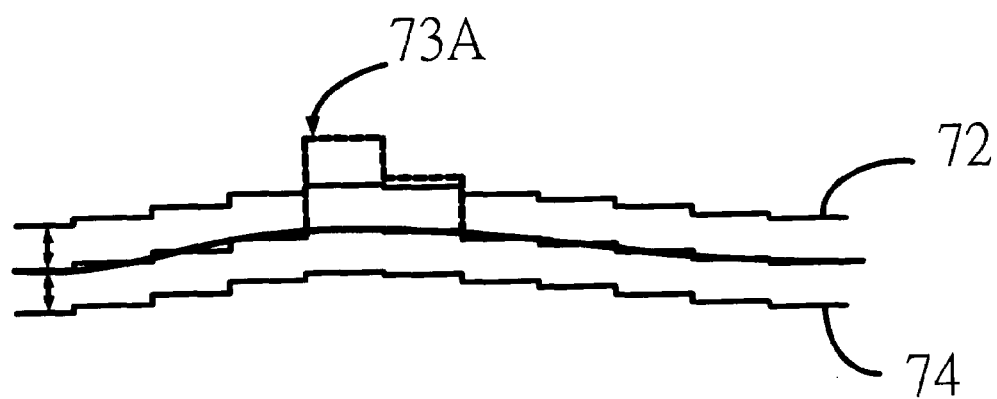
FIG. 4A
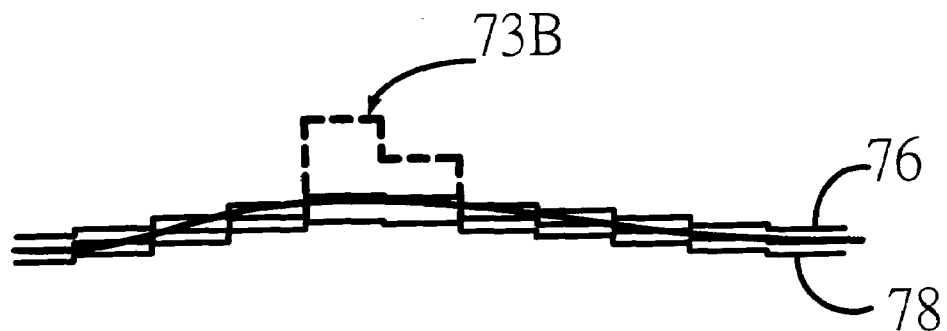
FIG. 4B
FIG. 4

MOTOR CONTROL SYSTEM HAVING OUTPUT CLAMP FUNCTION AND METHOD OF THE SAME

BACKGROUND OF THE INVENTION

1. Field of the invention

The present invention relates to a motor control system having a clamp function and method thereof for controlling a motor apparatus.

2. Description of the Prior Art

The motor control system of the prior art comprises a motor controller for controlling the operation of a motor apparatus. The motor controller generates a motor control output according to a feedback signal from the motor apparatus. However, damages on the disc surface above the spindle motor and external disturbances might all influence the feedback signal, thus causing abnormal motor control output and resulting in stability problem.

To solve the stability problem, the prior art limits the motor control output to be in a specific range or fixes the output in different conditions. Although these methods may avoid unknown disturbance to influence the motor, they will also influence the motor control output while the motor apparatus is in the normal state.

In U.S. Pat. No. 5,161,141, the optical information recording/reproducing system clamps the control voltage in a specific range. However, if the above method is applied to control the spindle motor, the normal control voltage will be limited in the clamp range while tracking normally, thus not capable of reflecting correct results.

SUMMARY OF THE INVENTION

The objective of the present invention is to provide a motor control system that has an output clamp function and method thereof, so as to avoid an abnormal motor control output resulted from external sudden change.

The motor control system of the present invention is used for controlling the operation of a motor apparatus. The motor control system comprises a motor controller and a clamp apparatus. The motor controller generates a motor control output, according to a reference signal and a feedback signal from the motor apparatus, to control the spinning speed of the motor. The clamp apparatus is used for receiving the motor control output, and it has a clamp function for clamping the motor control output to be under an acceptable range. The clamp range of the clamp apparatus is limited within a specific range according to the reference values obtained by the original motor control output via a low pass filter (LPF). The width of the range may be different according to different conditions.

The clamp apparatus determines whether the clamp function should be activated according to at least one motor stability signal.

When the motor stability signal indicates that the motor apparatus has not entered a stable state yet, the clamp apparatus does not clamp the motor control output from the motor controller. When the motor stability signal indicates that the motor apparatus has been in a stable state, the clamp apparatus clamps the motor control output from the motor controller in the acceptable clamp range, so as to avoid an abnormal motor control output resulting from any external sudden change. Furthermore, whether the clamp apparatus is activated may also be determined by firmware.

The motor control system and method of the present invention utilize the received motor stability signal to determine whether the clamp function should be activated. When the motor apparatus is in a stable state, the clamp apparatus performs clamping efficiently to avoid an abnormal motor control output resulting from any external sudden change.

The advantage and spirit of the invention may be understood by the following recitations together with the appended drawings.

BRIEF DESCRIPTION OF THE APPENDED DRAWINGS

FIG. 4 is a schematic diagram of clamp ranges in different conditions.

DETAILED DESCRIPTION OF THE INVENTION

Figure 1:
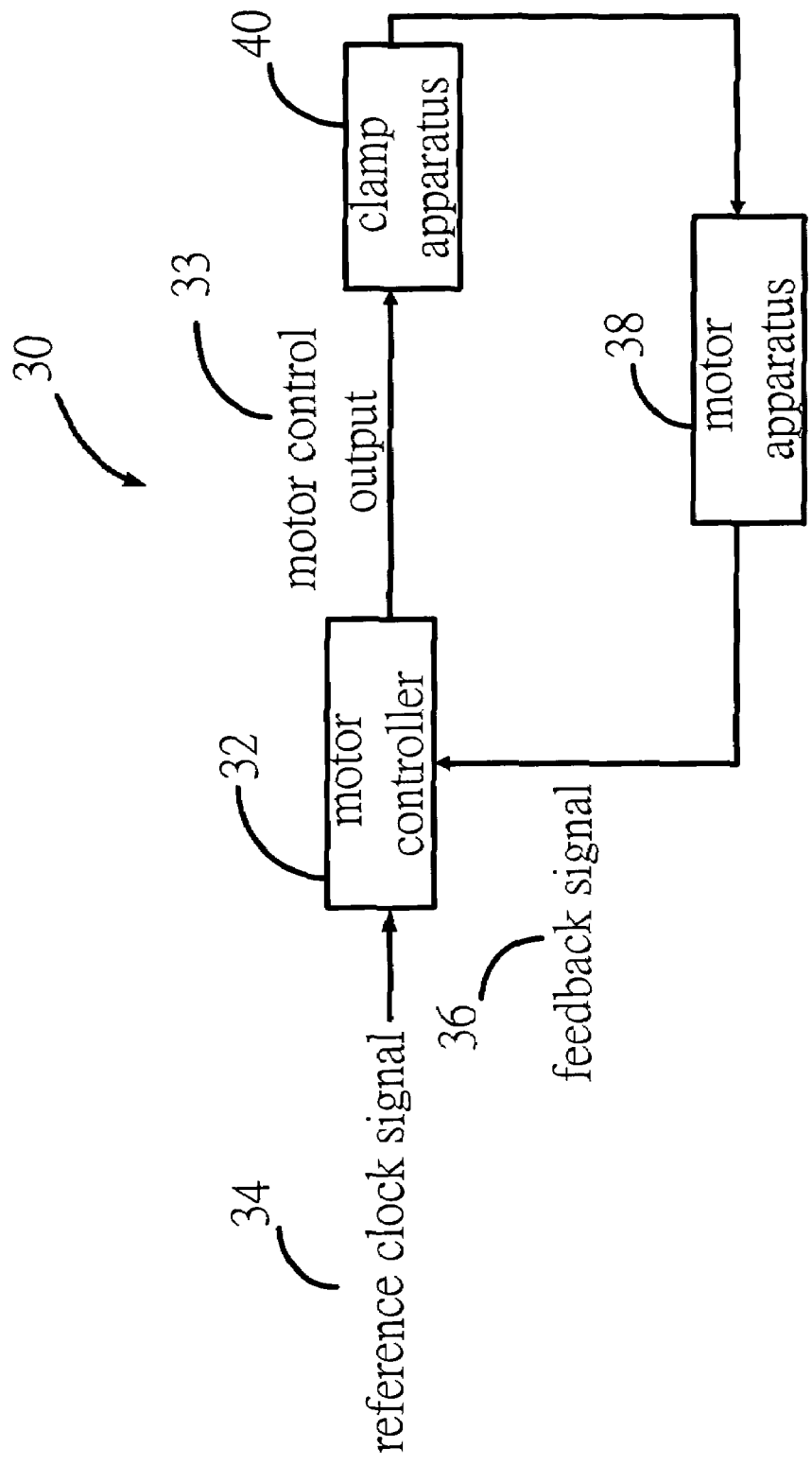
FIG. 1 is a block diagram of a motor control system of the present invention.

Please refer to FIG. 1. FIG. 1 is a block diagram of a motor control system 30 of the present invention. The motor control system 30 of the present invention is used for controlling the operation of a motor apparatus 38. The motor control system 30 comprises a motor controller 32 and a clamp apparatus 40. The motor controller 32 is used for generating a motor control output 33 according to a reference signal 34 and a feedback signal 36 from the motor apparatus 38. The clamp apparatus 40 is used for receiving the motor control output 33, and it has a clamp function for clamping the motor control output 33. According to at least one motor stability signal (not shown), the clamp apparatus 40 determines whether the clamp function should be activated to clamp the motor control output 33 within an acceptable clamp range. In this embodiment, the reference signal is a reference clock signal 34.

When the motor stability signal indicates that the motor apparatus 38 has not entered a stable state yet, the clamp apparatus 40 does not clamp the motor control output 33 from the motor controller 32. When the motor stability signal indicates that the motor apparatus 38 has been in a stable state, the clamp apparatus 40 clamps the motor control output 33 from the motor controller 32 in the acceptable clamp range, so as to avoid an abnormal motor control output resulting from any external sudden change.

Figure 2:
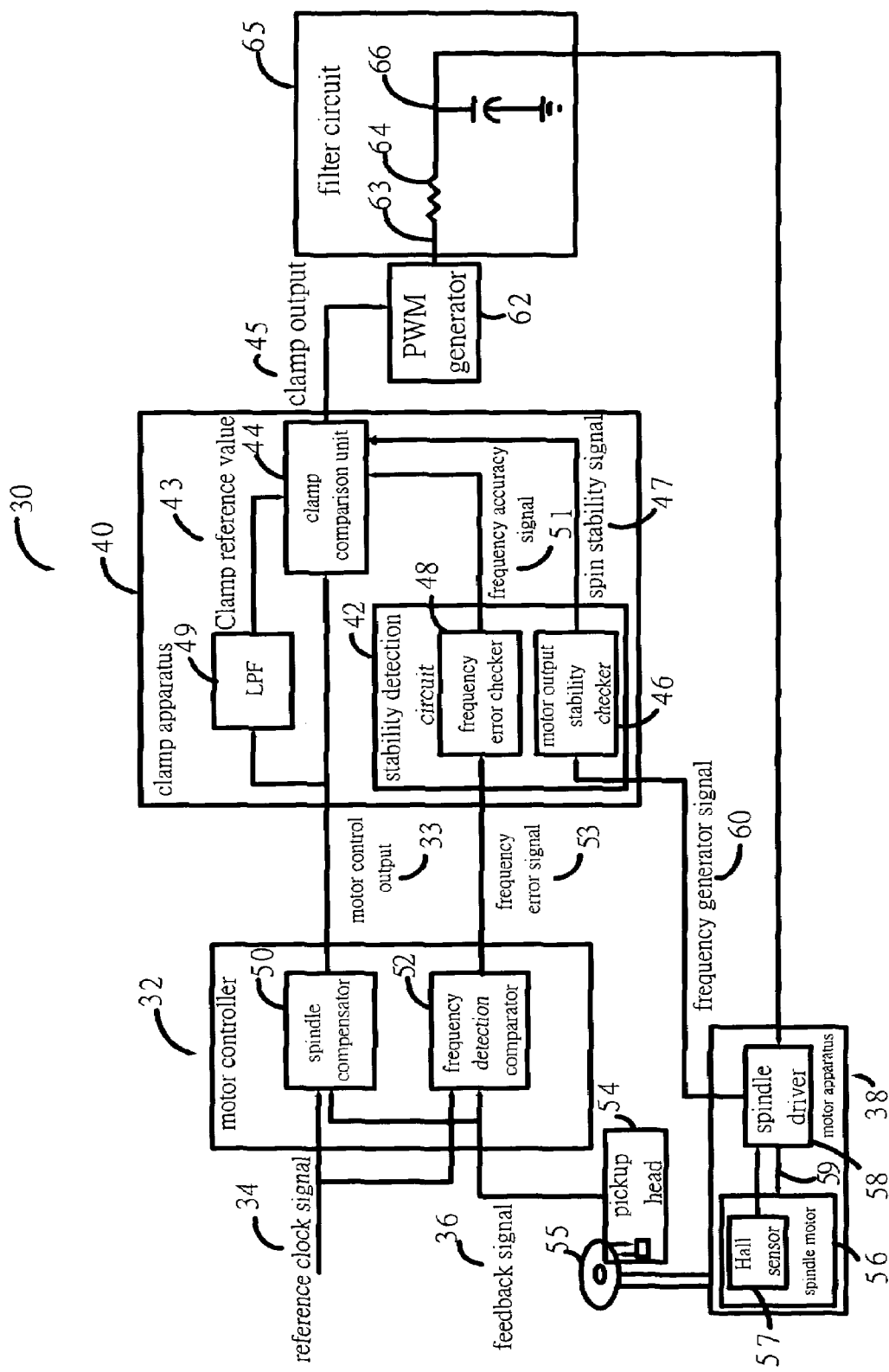
FIG. 2 is a schematic diagram of a motor apparatus and a motor control system accommodated in an optical information recording/reproducing system shown in FIG. 1.

Please refer to FIG. 2. FIG. 2 is a schematic diagram of a motor apparatus 38 and a motor control system 30 accommodated in an optical information recording/reproducing system shown in FIG. 1. The optical information recording/reproducing system comprises a pickup head 54 for reading/writing data from/to an optical recording medium 55.

The motor apparatus 38 comprises a spindle motor 56 and a spindle driver 58. The spindle motor 56 is used for rotating the optical recording medium 55. The spindle driver 58 is used for driving the spindle motor 56 according to a control voltage 59. The spindle motor 56 comprises a Hall sensor 57 for outputting a voltage to the spindle driver 58. The signals generated by the Hall sensor 57 are synthesized to form a frequency generator (FG) signal 60 to represent the current spin frequency of the spindle motor 56.

In the embodiment shown in FIG. 2, the optical information recording/reproducing system is a constant linear velocity (CLV) system. The feedback signal 36 is a signal obtained while the pickup head 54 reads data from the optical recording medium 55. When the optical information recording/reproducing system of the embodiment is a constant angular velocity (CAV) system (not shown), the feedback signal 36 is the frequency generator signal 60.

The motor controller 32 comprises a spindle compensator 50 and a frequency detection comparator 52. The spindle compensator 50 is used for detecting the frequency and phase error between the reference clock signal 34 and the feedback signal 36, and for generating the motor control output 33 to the clamp apparatus 40 to amend the motor speed and minimize the error. The frequency detection comparator 52 is used for comparing the reference clock signal 34 with the frequency of the feedback signal 36 to generate a frequency error signal 53, which shows the accuracy of the current spin and outputs the frequency error signal 53 to the clamp apparatus 40.

The clamp apparatus 40 is connected to a pulse width modulation (PWM) generator 62 for receiving an output of the clamp apparatus 40 to generate a corresponding modulation voltage 63. The modulation voltage 63 generates an output voltage via the spindle driver 58 to form the control voltage 59 via a filter circuit 65 that comprises a resistance 64 and a capacitance 66.

The clamp apparatus 40 comprises a low pass filter (LPF) 49, a clamp comparison unit 44, and a stability detection circuit 42. The LPF 49 is used for averaging and filtering the obtained motor control output 33 sequentially by a moving average way to obtain a plurality of corresponding clamp reference values 43. Then, the LPF 49 outputs the plurality of corresponding clamp reference values 43 to the clamp comparison unit 44.

The clamp comparison unit 44 is used for determining an upper bond and a lower bond according to the clamp reference values 43 inputted by the LPF 49 to form an acceptable clamp range. The upper bond and the lower bond are changed according to the clamp reference values 43 inputted by the LPF 49. The upper bond and the lower bond keep a fixed distance from the clamp reference values 43 inputted by the LPF 49. Furthermore, the clamp comparison unit 44 compares the current motor control output with the acceptable clamp range. When the motor apparatus 38 is not in the stable state, the clamp comparison unit 44 does not clamp the motor control output and outputs the motor control output to the pulse width modulation generator 62 directly. When the motor apparatus 38 is in the stable state, and the current motor control output is outside the acceptable clamp range, the clamp comparison unit 44 clamps the motor control output and assigns a clamp output 45 to the pulse width modulation generator 62.

The stability detection circuit 42 is used for detecting whether the motor apparatus 38 has entered the stable state according to the signal from the motor controller 32 or from the motor apparatus 38 and outputting the corresponding motor stability signal to the clamp comparison unit 44 to determine whether the clamp function is to be activated.

Figure 3:
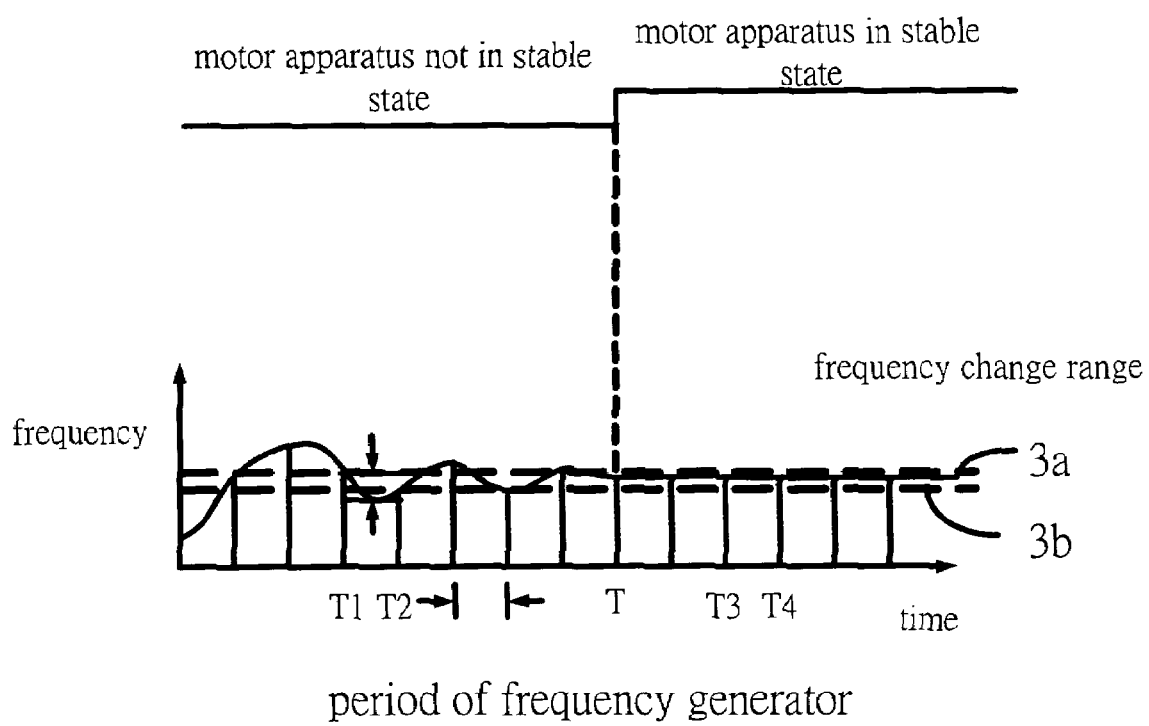
FIG. 3 is a diagram of the relationship between frequency and time of a frequency generator signal according to the present invention.

Please refer to FIG. 3. FIG. 3 is a diagram of the relationship between frequency and time of a frequency generator signal 60 according to the present invention. FIG. 3 is used for describing the state of the motor apparatus 38. As shown in FIG. 3, the range between the two curves 3a, 3b represents the changeable range of a predetermined FG frequency (i.e. spin of motor). For example, the deviation of frequency between time T1 and T2 is larger than the changeable range of frequency. On the other hand, the deviation of frequency between time T3 and T4 is smaller than the changeable range of frequency. Therefore, as shown in FIG. 3, the left side of time T representing the deviation of frequency is still outside the changeable range of frequency, which means that the motor apparatus 38 is not in a stable state yet. The right side of time T representing the deviation of frequency has been stable, so the motor apparatus 38 is in a stable state.

Please refer to FIG. 4A and FIG. 4B. FIG. 4A and FIG. 4B represent the assignment of clamp output in different acceptable clamp ranges. In different embodiments, the acceptable clamp range of the clamp comparison unit 44 may be set in different ranges and may have different ways to assign the clamp output. In one embodiment, the clamp comparison unit 44 directly utilizes the current obtained clamp reference values to be the clamp output. This way is suitable for larger acceptable clamp range. In another embodiment, the clamp comparison unit 44 selects one out of either the upper bond or the lower bond of the acceptable clamp range, whichever is closer to the current motor control output, or the original predetermined values to be the clamp output. This way is suitable for smaller acceptable clamp range.

The condition of a larger acceptable clamp range is described in the following with FIG. 4A. As shown in FIG. 4A, the area between the two curves 72, 74 represents the acceptable clamp range. When the motor apparatus is in the stable state, the motor control output still changes a little because of tracking. Therefore, the range, which has been set, is larger than the change value to allow the output to have a little variation, so as to reflect normal motor control output. As shown in FIG. 4A, the abnormal signal indicated by the arrow 73A shows that the motor control output exceeds the range. Once the motor control output exceeds the range, the clamp reference value is taken to be the clamp output, so as to prevent the controlled body to be out of control, resulting from abnormal motor control output.

The condition of a smaller acceptable clamp range is described in the following with FIG. 4B. As shown in FIG. 4B, the area between the two curves 76, 78 represents the acceptable clamp range. As shown in FIG. 4B, the abnormal signal indicated by the arrow 73B shows that the motor control output exceeds the range and is larger than the upper bond of the acceptable clamp range, so the upper bond is taken to be the clamp output. Therefore, the motor control output is clamped within the range according to the clamp reference value, and external sudden change is reflected by the small variation. In this way, larger abnormal output will not be caused to influence the stability of the motor apparatus.

Please refer back to FIG. 2. In this embodiment, the motor stability signal comprises a frequency accuracy signal 51 and a spin stability signal 47. The frequency accuracy signal 51 is used for indicating that the frequency error signal 53 is already in a predetermined frequency error range. The spin stability signal 47 is used for indicating that the deviation of the current spin frequency of the spindle motor 56 is already in a predetermined spin error range.

As shown in FIG. 2, the stability detection circuit 42 comprises a frequency error checker 48 and a motor output stability checker 46. The frequency error checker 48 is used for receiving the frequency error signal 53 generated by the frequency detection comparator 52 of the motor controller 32. When the frequency error checker 48 determines, according to the frequency error signal 53, that the current spin frequency of the spindle motor 56 is near the predetermined desired spin frequency, the frequency error checker 48 outputs the frequency stability signal 51 to the clamp comparison unit 44. On the other hand, when the deviation of spin is within the predetermined frequency error range, the motor output stability checker 46 outputs the spin stability signal 47 to the clamp comparison unit 44.

As shown in FIG. 2, motor output stability checker 46 is used for receiving the frequency generator signal 60 and measuring the frequency of the frequency generator signal 60 at every other period of time. When the frequency variation of the frequency generator signal 60, which represents the current spin frequency of the spindle motor 56, is within the spin error range, the spin stability signal 47 will be outputted to the clamp comparison unit 44. In the other words, when the current spin deviation of the spindle motor 56 is already in the predetermined spin error range, the spin stability signal 47 is outputted to the clamp comparison unit 44.

In another embodiment, the clamp apparatus 40 comprises an analog to digital (A/D) converter (not shown) for receiving and converting the control voltage outputted by the filter circuit 65, comprising a resistance 64 and a capacitance 66, to obtain a plurality of corresponding clamp reference values.

The motor control system 30 of the present invention utilizes the stability detection circuit 42 to determine whether the clamp function should be activated. In different applications, the stability detection circuit 42 has a lot of different modes for selection. One mode may utilize the frequency error signal 53 and the spin stability signal 47 at the same time to determine whether the clamp function should be activated. Another mode may utilize the frequency error signal 53 or the spin stability signal 47 respectively to determine whether the clamp function should be activated. Moreover, the firmware may also be used to determine stability or activation of the clamp function.

Figure 5:
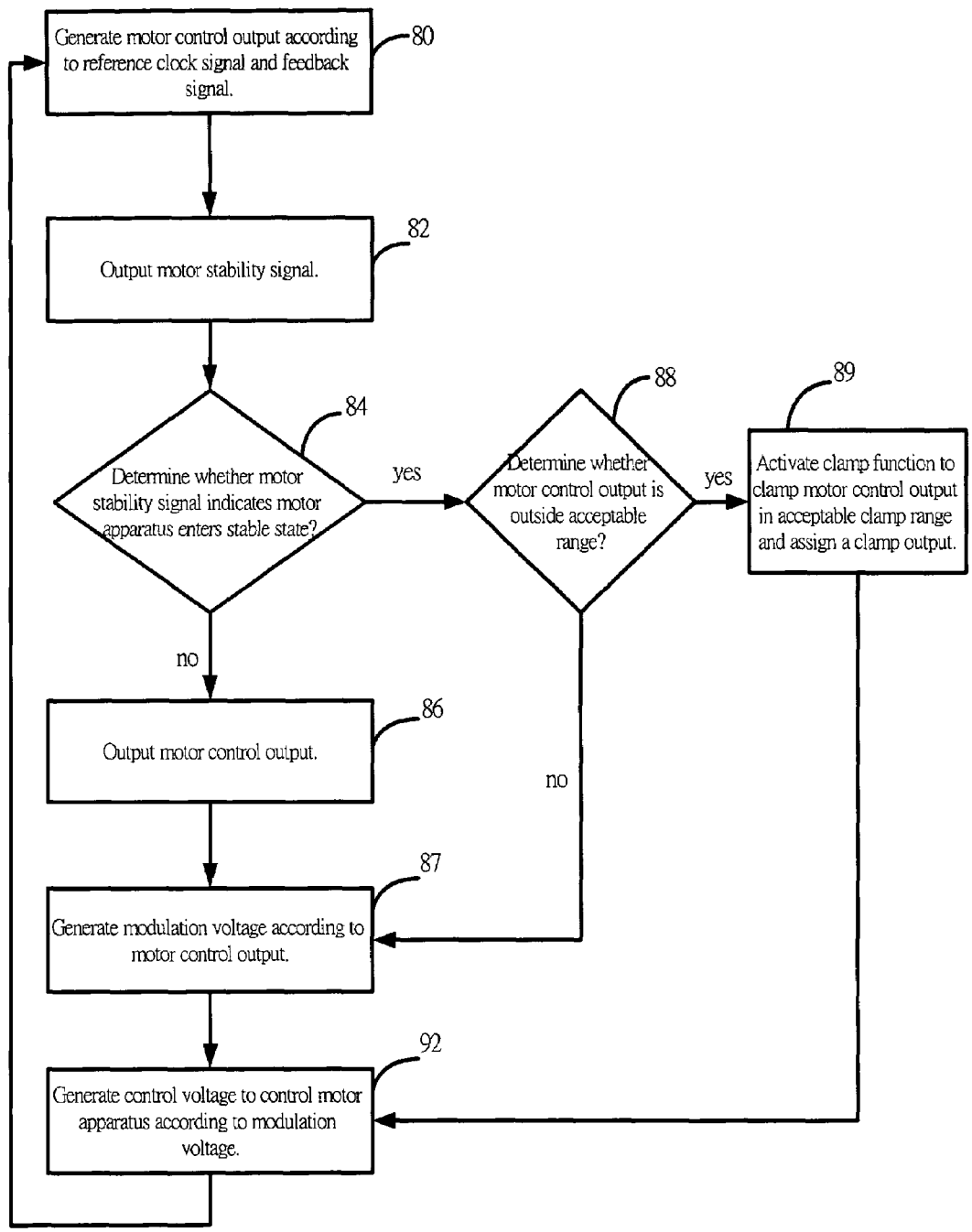
FIG. 5 is a flowchart of a motor control method of the present invention.

Please refer to FIG. 5. FIG. 5 is a flowchart of a motor control method of the present invention. The motor control method of the present invention, which is used for controlling the motor apparatus 38, is described in the following by utilizing FIG. 1, FIG. 2, and FIG. 5. The motor control method of the present invention comprises the following steps:

Step 80: Generate the motor control output 33 according to the reference clock signal 34 and the feedback signal 36.

Step 82: Output the motor stability signal.

Step 84: Determine whether the motor stability signal indicates that the motor apparatus 38 enters the stable state. If yes, go to step 88, otherwise, go to step 86.

Step 86: Output the motor control output 33 directly.

Step 87: Generate the modulation voltage 63 according to the motor control output 33 and go to step 92.

Step 88: Determine whether the motor control output is outside the acceptable range. If yes, go to step 89, otherwise, go to step 86.

Step 89: Activate the clamp function to clamp the motor control output 33 within the acceptable clamp range, and assign a clamp output; go to step 87.

Step 90: Generate the modulation voltage 63 according to the assigned clamp output 45.

Step 92: Generate the control voltage 59 to control the motor apparatus 38 according to the modulation voltage 63.

In step 88, if the motor apparatus 38 has entered the stable state, but the current motor control output is outside the acceptable range, meaning there is external sudden change, the clamp function will be activated, and the motor apparatus 38 is controlled according to the assigned clamp output. This way can prevent external sudden change from causing abnormal motor control output, which will influence the normal operation of the motor apparatus.

The present invention utilizes the stability detection circuit 42 to determine whether the clamp function should be activated. When the motor has not entered the stable state, the stability detection circuit 42 will not activate the clamp function. When the motor enters the stable state, the clamp function will be activated. Compared with the prior art, the present invention not only provides the mode to determine the stability detection circuit 42 under different conditions but also reduces much convergence time of the motor, so as to effectively improve the disadvantage of the prior art.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A motor control system for controlling a motor apparatus, the motor control system comprising:
    a motor controller for generating a motor control output according to a reference signal and a feedback signal from the motor apparatus; and
    a clamp apparatus for receiving the motor control output and having a clamp function for clamping the motor control output, the clamp apparatus determining whether the clamp function should be activated to clamp the motor control output within an acceptable clamp range according to at least one motor stability signal;
wherein when the motor stability signal indicates that the motor apparatus has not entered a stable state yet, the clamp apparatus does not clamp the motor control output from the motor controller, and when the motor stability signal indicates that the motor apparatus has been in a stable state, the clamp apparatus clamps the motor control output from the motor controller in the acceptable clamp range so as to avoid an abnormal motor control output resulting from external sudden change.

2. The motor control system of claim 1, wherein the motor apparatus and the motor control system are accommodated in an optical information recording/reproducing system, the optical information recording/reproducing system comprises a pickup head for reading/writing data from/to an optical recording medium, and the motor apparatus comprises:
    a spindle motor for rotating the optical recording medium; and
    a spindle driver for driving the spindle motor according to a control voltage.

3. The motor control system of claim 2, wherein the spindle motor comprises a Hall sensor, and signals generated by the Hall sensor are synthesized to form a frequency generator signal to represent current spin frequency of the spindle motor.

4. The motor control system of claim 3, wherein when the optical information recording/reproducing system is a constant linear velocity (CLV) system, the feedback signal is a signal obtained while the pickup head reads data from the optical recording medium, and when the optical information recording/reproducing system is a constant angular velocity (CAV) system, the feedback signal is the frequency generator signal.

5. The motor control system of claim 3, wherein the reference signal is a reference clock signal, and the motor controller comprises:
a spindle compensator for compensating and amending the reference clock signal according to the feedback signal to generate the motor control output to the clamp apparatus; and
a frequency detection comparator for comparing the reference clock signal with the frequency of the feedback signal to generate a frequency error signal.

6. The motor control system of claim 5, wherein the clamp apparatus is connected to a pulse width modulation (PWM) generator for receiving an output of the clamp apparatus to generate a corresponding modulation voltage, and the modulation voltage further generates the control voltage via a filter circuit comprising a resistance and a capacitance.

7. The motor control system of claim 6, wherein the clamp apparatus comprises an analog to digital (A/D) converter for receiving and converting the control voltage outputted by the filter circuit, comprising the resistance and the capacitance, to obtain a plurality of corresponding clamp reference values.

8. The motor control system of claim 6, wherein the clamp apparatus comprises:
a low pass filter for averaging and filtering the obtained motor control output sequentially by a moving average way to obtain a plurality of corresponding clamp reference values;
a clamp comparison unit for determining an upper bond and a lower bond according to the obtained clamp reference values to form the acceptable clamp range and comparing the current motor control output with the acceptable clamp range, when the motor apparatus is not in the stable state or the current motor control output is in the acceptable clamp range, the clamp comparison unit does not clamp the motor control output and outputs the motor control output to the pulse width modulation generator directly, and when the motor apparatus has been in the stable state and the current motor control output is outside the acceptable clamp range, the clamp comparison unit clamps the motor control output and assigns a clamp output to the pulse width modulation generator; and
a stability detection circuit, for detecting whether the motor apparatus enters the stable state according to the signal from the motor controller or from the motor apparatus, and outputting the corresponding motor stability signal to the clamp comparison unit to determine whether the clamp function is to be activated.

9. The motor control system of claim 8, wherein the clamp comparison unit utilizes the currently obtained clamp reference value to be the clamp output.

10. The motor control system of claim 8, wherein the clamp comparison unit selects one out of both the upper bond and the lower bond of the acceptable clamp range, whichever is closer to the current motor control output, to be the clamp output.

11. The motor control system of claim 8, wherein the motor stability signal comprises a frequency accuracy signal and a spin stability signal, the frequency accuracy signal is used for indicating that the frequency error signal has been in a predetermined frequency error range, and the spin stability signal is used for indicating that the deviation of the current spin frequency of the spindle motor has been in a predetermined spin error range.

12. The motor control system of claim 11, wherein the stability detection circuit comprises:
a frequency error checker for receiving the frequency error signal generated by the frequency detection comparator and outputting the frequency stability signal to the clamp comparison unit when the frequency error checker determines, according to the frequency error signal, that the current spin frequency of the spindle motor has approximated a predetermined desired spin frequency; and
a motor output stability checker for receiving the frequency generator signal, measuring the frequency of the frequency generator signal at every other period of time, and outputting the spin stability signal to the clamp comparison unit when the frequency variation of the frequency generator signal, which represents the current spin frequency of the spindle motor, is within the spin error range.

13. A motor control method for generating a motor control output to control a motor apparatus, the motor control method comprising the following steps:
generating the motor control output according to a reference signal and a feedback signal from the motor apparatus; and
determining whether the motor control output is clamped in an acceptable clamp range according to at least one motor stability signal;
wherein when the motor stability signal indicates that the motor apparatus has not entered a stable state yet, the clamp apparatus does not clamp the motor control output from the motor controller, and when the motor stability signal indicates that the motor apparatus has been in a stable state, the clamp apparatus clamps the motor control output from the motor controller in the acceptable clamp range so as to avoid an abnormal motor control output resulting from external sudden change.

14. The motor control method of claim 13, wherein the motor apparatus are accommodated in an optical information recording/reproducing system, the optical information recording/reproducing system comprises a pickup head for reading/writing data from/to an optical recording medium, and the motor apparatus comprises:
a spindle motor for rotating the optical recording medium; and
a spindle driver for driving the spindle motor according to a control voltage;
wherein the spindle motor comprises a Hall sensor, and signals generated by the Hall sensor are synthesized to form a frequency generator signal to represent current spin frequency of the spindle motor.

15. The motor control method of claim 14, wherein when the optical information recording/reproducing system is a constant linear velocity system, the feedback signal is a signal obtained while the pickup head reads data from the optical recording medium, and when the optical information recording/reproducing system is a constant angular velocity system, the feedback signal is the frequency generator signal.

16. The motor control method of claim 14, wherein the reference signal is a reference clock signal, and the method further comprises the following steps:
compensating and amending the reference clock signal according to the feedback signal to generate the motor control output; and
comparing the reference clock signal with the frequency of the feedback signal to generate a frequency error signal.

17. The motor control method of claim 16, wherein the motor control output generated by the method is transmitted to a pulse width modulation generator to generate a corresponding modulation voltage, and the modulation voltage generates the control voltage via a filter circuit, comprising a resistance and a capacitance.

18. The motor control method of claim 17, wherein the method further comprises the following steps:
   averaging and filtering the obtained motor control output sequentially by a moving average way to obtain a plurality of corresponding clamp reference values;
   determining an upper bond and a lower bond according to the obtained clamp reference values to form the acceptable clamp range and comparing the current motor control output with the acceptable clamp range, when the motor apparatus is not in the stable state or the current motor control output is in the acceptable clamp range, the clamp comparison unit does not clamp the motor control output and outputs the motor control output to the pulse width modulation generator directly, and when the motor apparatus has been in the stable state and the current motor control output is outside the acceptable clamp range, the clamp comparison unit clamps the motor control output and assigns a clamp output to the pulse width modulation generator; and
   detecting whether the motor apparatus enters the stable state according to the signal from the motor apparatus and outputting the corresponding motor stability signal.

19. The motor control method of claim 18, wherein the method utilizes the currently obtained clamp reference values to be the clamp output.

20. The motor control method of claim 18, wherein the method selects one out of both the upper bond and the lower bond of the acceptable clamp range, whichever is closer to the current motor control output, to be the clamp output.

* * * * *